United States Patent Office

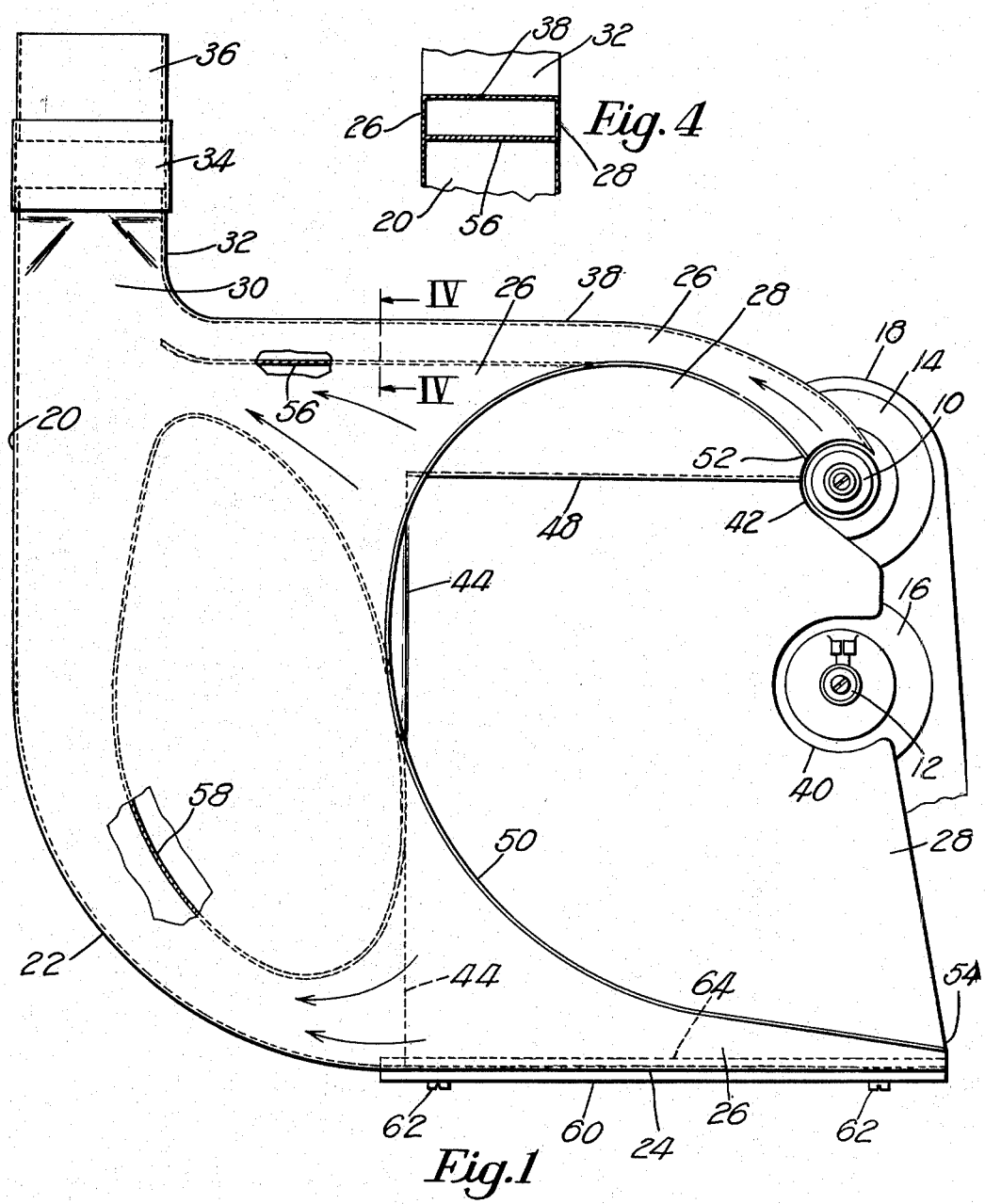

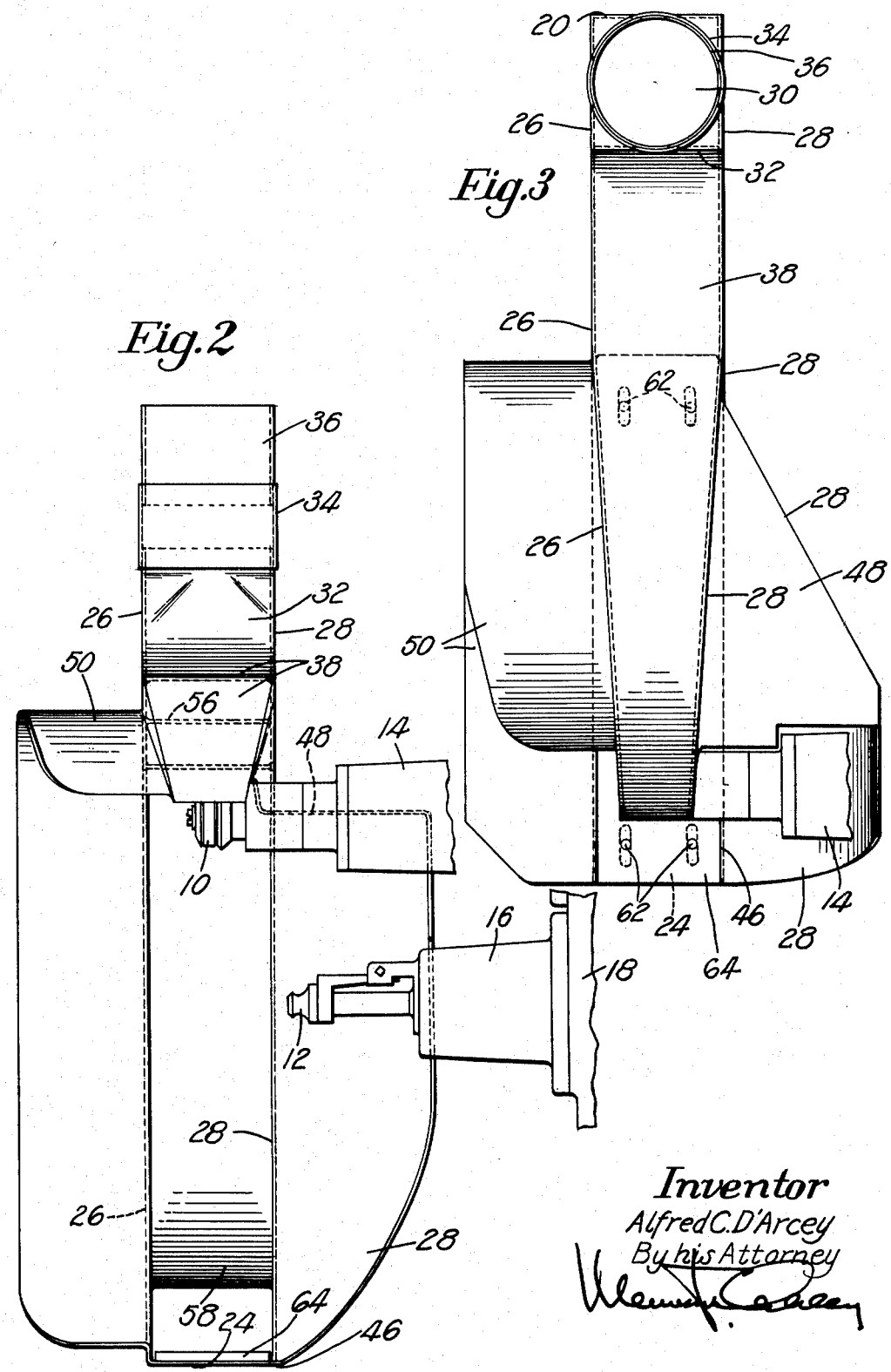

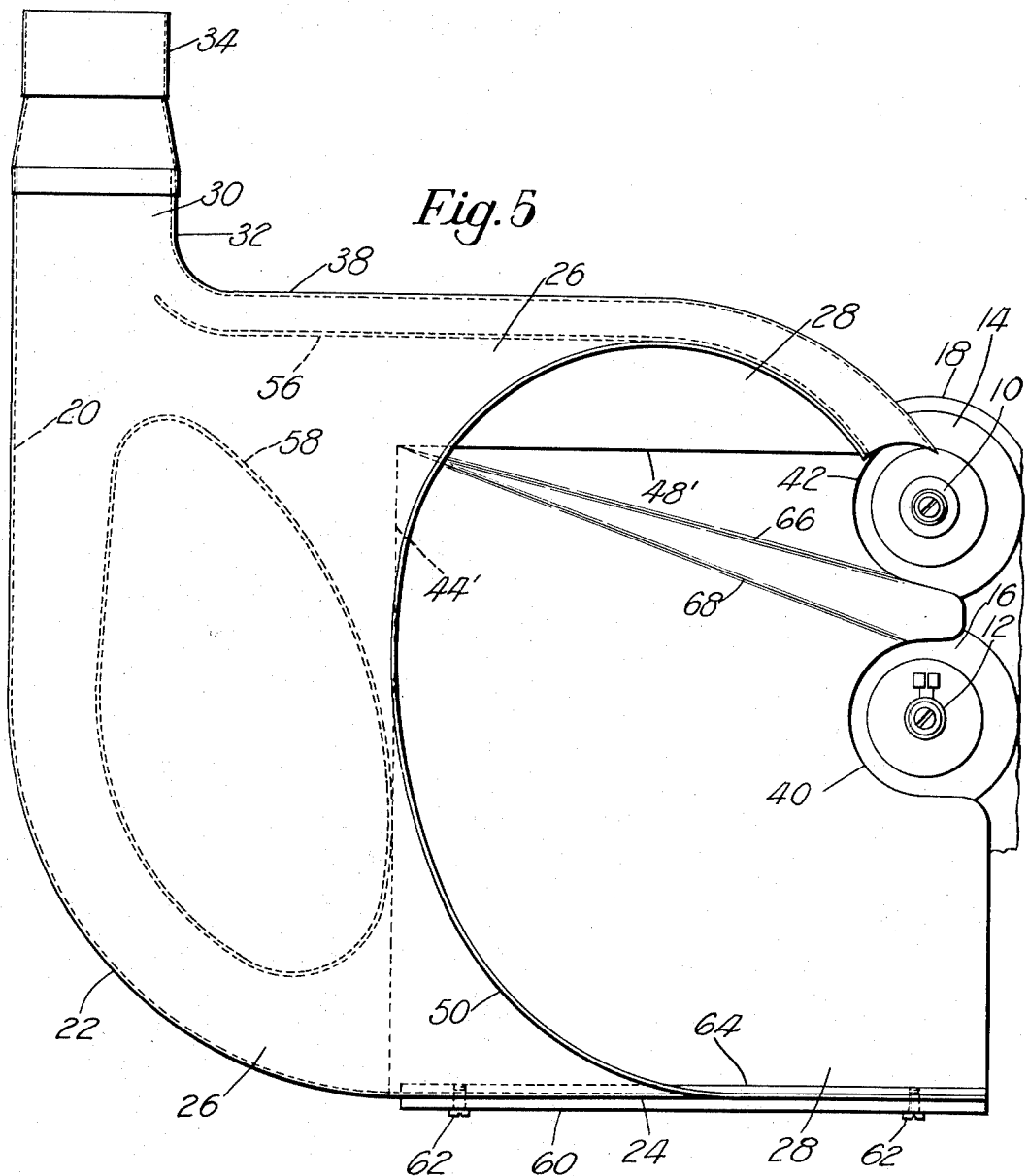

2,729,927
Patented Jan. 10, 1956

2,729,927
DUST COLLECTING HOODS

Alfred C. D'Arcey, Danvers, Mass., assignor to United Shoe Machinery Corporation, Flemington, N. J., a corporation of New Jersey Application April 19, 1952, Serial No. 283,206

6 Claims. (Cl. 51—273)

This invention relates to hoods for collecting dust or chips arising from the operation of abrading, scouring, or trimming tools and it is herein disclosed as embodied in a dust hood suitable for use on a machine for trimming the edges of shoe soles such as that disclosed in United States Letters Patent No. 2,210,005, granted August 6, 1940, upon the application of Eugene J. Ray. For examples of dust hoods which have previously been proposed for use on edge trimming machines, reference may be had to United States Letters Patent No. 965,223, granted July 26, 1910, upon the application of Thomas G. Plant, and No. 1,797,261, granted March 24, 1931, upon the application of Albert W. Hallam.

The present invention consists in the novel features hereinafter described, reference being had to the accompanying drawings which illustrate one embodiment of the same, selected for purposes of illustration, and the said invention is fully disclosed in the following description and claims.

In the accompanying drawings,

Fig. 1 is a side elevation of an illustrative dust hood embodying the invention;

Fig. 2 is a front elevation of the dust hood shown in Fig. 1;

Fig. 3 is a plan view of the illustrative dust hood;

Fig. 4 is a section taken on the line IV—IV of Fig. 1; and

Fig. 5 is a side elevation of a modification of the dust hood shown in the preceding figures.

The dust hood illustrated herein is shown in relation to two edge trimming tools 10 and 12 corresponding respectively to the tools 13 and 17 of the machine disclosed in Letters Patent No. 2,210,005, above mentioned. The bearing sleeves for the shafts of the tools 10 and 12 are indicated by the reference numerals 14 and 16 respectively, and the machine frame by the reference numeral 18.

The illustrated dust hood is made of sheet metal and is fabricated in accordance with standard practice. For simplicity of illustration, a showing of the separate pieces of sheet metal and the joints between them is omitted.

This dust hood has a rear wall 20, the upper portion of which is vertical and the lower portion 22 of which extends forward in a curve of large radius to merge smoothly into a bottom wall 24 which extends forward with uniform width from the rear wall. Also extending forward from the rear wall 22 is a left hand lateral or side wall 26 and a right hand lateral or side wall 28. The rear portion of the dust hood has an upwardly extending exhaust passage 30 which is square in cross section and is formed by upward extensions of the rear wall 20 and the left and right lateral walls 26 and 28, and also by a vertical front wall 32 bridging the space between the lateral walls. The exhaust passage 30, as it extends up, changes from square to round in cross section and the round portion is fitted, by means of a circular reinforcing and coupling sleeve 34, to a circular upward extension 36, which circular upward extension of the exhaust passage is adapted for connection to a suction dust exhaust system, not shown herein. The exhaust passage 30, together with the coupling sleeve 34 and the upward extension 36, forms a discharge duct communicating with the space between the side walls. The front wall 32 of the exhaust passage 30 extends down and forward, merging by a curve of small radius into a top wall 38 which bridges the space between the upper edges of the lateral walls 26 and 28. The rear wall 20, its lower portion 22, the bottom wall 24 and the top wall 38 together constitute a peripheral wall extending along and between the side walls from the front ends of their bottom edges to the front ends of their top edges. As thus described, and as shown in the drawings, the illustrated dust hood has a rear portion shaped to define the exhaust passage 30, which rear portion has extending forward therefrom, to constitute a forward portion of the hood, two lateral walls 26 and 28, a top wall 38, and a bottom wall 24, and these four walls define a space communicating with the exhaust passage.

The top wall 38 extends forward far enough to cover the upper edge trimming tool 10, the forward portion of the top wall curving down gradually to bring it close to the tool. The bottom wall 24 extends forward a little further than the top wall 38. The right hand lateral wall 28 extends forward, at its lower portion, as far as the forward end of the bottom wall 24 and, at its upper portion, as far forward as the forward end of the top wall 38; and it has substantially in its entirety a forward extent approximately equal to that of the top and bottom walls. It lacks having such forward extent in its entirety only because there are formed in its front edge a notch or opening 40 to clear the bearing sleeve 16 and another notch or opening 42 to clear the bearing sleeve 14.

The right hand lateral wall 28 is shaped to include within the hood the two edge trimming tools 10 and 12 with a minimum but sufficient clearance consistent with manipulation of the shoe. Inasmuch as the lower tool 12 is positioned further to the right than the upper tool 10, the lower portion of the wall 28 is flared laterally out to the right. This flare begins at a vertical line 44 (Fig. 1) and increases progressively toward the forward portion of the wall 28 except along the lower portion of the wall (Figs. 2), which is curved to terminate in a lower edge 46 coincident with the right hand edge of the bottom wall 24. The forward upper portion of the wall 28 does not flare to the right but inclines slightly to the left as it approaches the upper tool 10. A horizontal and generally triangular shaped wall 48 extends between the unflared and the flared portions of the wall 28 and seals what would otherwise be an open space resulting from the flare.

The forward portion of the left hand wall 26 is cut away substantially from top to bottom in the shape of the letter C, with the gap of the C disposed forward, to provide a relatively large opening affording clearance for a shoe to be presented to the tools 10 and 12. Extending horizontally and laterally to the left from the C-shaped cut away edge is a lip or flange 50. The lip 50 insures against turbulence which might otherwise result from air entering the hood from the rear of the C-shaped edge and abruptly reversing its direction in passing around the C-shaped edge. As best seen in Fig. 1, the cut away edge and the lip 50 do not actually extend up quite as high as the top wall 38, but to a locality somewhat below it, and they do not reach down completely to the bottom wall 24, but to a locality slightly above it. The C-shaped opening, however, is large enough to permit manipulation of a shoe without interference during presentation of the shoe to the tools 10 and 12. The C-shaped lip 50 has an upper forward end 52 which is adjacent to (but spaced a short distance from) the forward end of the top wall 38, and a lower forward end 54 which is adjacent to the forward end of the bottom wall 24.

In order to insure an adequate draft at the upper tool 10, a partition 56 is provided to form a draft duct within the hood. The partition 56 is close to and substantially parallel along its rear portion to the top wall 38 and it extends across the space between the lateral walls 26 and 28. The duct thus formed is shown in cross section in Fig. 4. The partition 56 terminates rearwardly in the exhaust passage 30 where the suction is strong. The forward portion of the partition 56 follows the curve of the upper portion of the C-shaped edge of the lateral wall 26, and the forward opening or adit of the duct is just above the tool 10. The forward portion of the duct narrows in width, and increases in depth, toward the forward end of the duct.

In order to intensify the draft through the hood and prevent the deposit of dust and chips, the hood is provided with a smoothly curved baffle 58 having the form of a somewhat distorted ellipse and enclosing a dead air space, the major axis of the ellipse being inclined somewhat rearwardly from the vertical. This ellipsoidal baffle 58 extends across the space between the lateral walls 26 and 28 and it is positioned to the rear of the C-shaped opening of the wall 26. It cooperates with the rear wall 20 (including the curved portion 22) and the bottom wall 24 to provide a narrow lower streamlined passageway leading from the forward portion of the hood into the exhaust passage 30, and it cooperates with the partition 56 to provide a narrow upper streamlined passage leading from the forward portion of the hood into the exhaust passage. The direction of air flow in various portions of the dust hood is indicated by arrows in Fig. 1.

The hood is supported by a bracket 60 mounted on the machine frame 18. It is secured upon the bracket 60 by clamping screws 62 extending through slots in the bottom wall 24 and threaded into a clamping plate 64.

In the modification shown in Fig. 5, the C-shaped cut in the left hand lateral wall 26 extends all the way down to the bottom wall 24 and terminates rearwardly of the forward edge of the bottom wall. The laterally extending lip 50 follows the curvature of the C-shaped edge to the lower termination of said edge and then continues forward as far as the forward edge of the bottom wall 24. This forward extension of the lip 50 is continuous with the forward portion of the bottom wall 24 and together they form a continuous flat surface which serves as a rack for workpieces. The right hand lateral wall 28 of the modification is flared laterally out to the right along a line of bend 44′ corresponding to, but extending higher than, the line 44 on Fig. 1. A horizontal wall 48′ corresponds to the wall 48 to seal the space between the flared and unflared portions. In the modification, the full extent of the flare is not attained at the level of the wall 48′ and a further flare begins at a line of outward bend 66 on Fig. 5 and increases to a line of downward bend 68, such increase taking place below the level of the tool 10 and above the level of the tool 12. The tools 10 and 12 are thus included within the dust hood with a minimum of clearance consistent with manipulation of the shoe.

Having thus described my invention, what I claim as new and desire to secure by Letters Patent of the United States is:

1. An edge trimmer dust hood having a rear portion shaped to define an exhaust passage for connection to a suction system, which rear portion has extending forwardly therefrom, to constitute a forward portion of the hood, two lateral walls, a top wall, and a bottom wall, which four walls define a space communicating with the exhaust passage, one of said lateral walls having an opening in its forward portion and having a lip extending laterally out from the edge of said opening, said hood having also a smoothly curved constricting baffle enclosing a dead air space and extending across the space between the lateral walls and shaped to divide that space into narrow upper and lower streamlined passageways leading from the forward portion of the hood into the exhaust passage.

2. A hood like that defined in claim 1 and characterized further by the fact that a partition extending across the space between the lateral walls cooperates with the top wall to define a duct having an inlet opening at the forward end of the top wall and adjacent to the upper of the two tools of a conventional edge trimming machine with which the hood is associated, said partition terminating rearwardly in the exhaust passage of the hood and said duct leading into said exhaust passage.

3. In combination with an edge trimming machine having a trimming tool on the left end of a driven shaft and another trimming tool on the left end of another driven shaft, the second-mentioned tool being to the left of the first-mentioned tool and at a higher level, a dust hood having a rear portion shaped to define an exhaust passage for connection to a suction system, which rear portion has extending forwardly therefrom, to constitute a forward portion of the hood, right- and left-hand lateral walls, a top wall, and a bottom wall, which four walls define a space communicating with the exhaust passage, a smoothly curved constricting baffle enclosing a dead air space and extending across the space between the lateral walls and shaped to divide that space into narrow upper and lower streamlined passageways leading from the forward portion of the hood into the exhaust passage, a partition extending across the space between the lateral walls and cooperating with the top wall to define a duct having an inlet opening at the forward end of the top wall adjacent to the second-mentioned edge trimming tool, said partition terminating rearwardly in the exhaust passage of the hood and said duct leading into said exhaust passage, the right wall including with minimum clearance within the hood the second-mentioned edge trimming tool and having its lower portion flared out to the right to include the first-mentioned edge trimming tool within the hood, the left wall being cut away from top to bottom in the shape of the letter C with the gap of the C disposed forwardly, and a lip extending laterally from the C-shaped forward edge of the left wall.

4. An exhaust hood for shoe sole edge trimmers comprising a sheet metal body having a pair of spaced side walls, a peripheral wall extending along and between the side walls from the front ends of their bottom edges to the front ends of their top edges, a discharge duct communicating with the space between the side walls, said body being open at its front edge, one of said side walls having a relatively small opening for receiving a shoe sole edge trimmer, the other of said side walls having a relatively large opening for passing a shoe into said body for engagement with the edge trimmer, and an ellipsoidal baffle extending between said side walls in said body adjacent to the back, bottom and top edges of said side walls.

5. An exhaust hood for shoe sole edge trimmers comprising a sheet metal body having a pair of spaced side walls, a peripheral wall extending along and between the side walls from the front ends of their bottom edges to the front ends of their top edges, a discharge duct communicating with the space between the side walls, said body being open at its front edge, one of said side walls having a relatively small opening for receiving a shoe sole edge trimmer, the other of said side walls having a relatively large opening for passing a shoe into said body for engagement with the edge trimmer, an ellipsoidal baffle extending between said side walls in said body adjacent to the back bottom and top edges of said side walls, and a partition extending between said side walls and closely adjacent to the top wall and providing with said top and side walls a suction conduit, said conduit having its adit adjacent to said small opening for withdrawing dust from the trimmer and having its exit disposed in said duct.

6. An exhaust hood for shoe sole edge trimmers comprising a sheet metal body having a pair of spaced side walls, a peripheral wall extending along and between the side walls from the front ends of their bottom edges to the front ends of their top edges, a discharge duct communicating with the space between the side walls, said body being open at its front edge, one of said side walls having a relatively small opening for receiving a shoe sole edge trimmer, the other of said side walls having a relatively large opening for passing a shoe into said body for engagement with the edge trimmer, an ellipsoidal baffle extending between said side walls in said body adjacent to the back, bottom and top edges of said side walls, and a partition extending between said side walls and closely adjacent to the top wall and providing with said top and side walls a suction conduit, said conduit having its adit adjacent to said small opening for withdrawing dust from the edge trimmer and having its exit disposed in said duct, the front portion of said one of said side walls below said smaller opening being disposed outwardly from said other of said side walls to form a guide to catch dust dropping from said edge trimmer.

References Cited in the file of this patent

UNITED STATES PATENTS

| | | |
|---|---|---|
| 718,155 | Pine | Jan. 13, 1903 |
| 849,338 | Rogers | Apr. 2, 1907 |
| 958,288 | Plant | May 17, 1910 |
| 965,223 | Plant | July 26, 1910 |
| 990,086 | Wertz et al. | Apr. 18, 1911 |
| 2,054,932 | Fleming | Sept. 22, 1936 |
| 2,225,225 | McElevey | Dec. 17, 1940 |